(12) United States Patent
Chao et al.

(10) Patent No.: US 11,716,101 B2
(45) Date of Patent: Aug. 1, 2023

(54) MULTI-RADIO DEVICE

(71) Applicant: NXP USA, Inc., Austin, TX (US)

(72) Inventors: Yi-Ling Chao, Sunnyvale, CA (US);
Yiqing Shen, Santa Clara, CA (US)

(73) Assignee: NXP USA, Inc., Austin, TX (US)

( * ) Notice: Subject to any disclaimer, the term of this patent is extended or adjusted under 35 U.S.C. 154(b) by 101 days.

(21) Appl. No.: 17/302,026

(22) Filed: Apr. 21, 2021

(65) Prior Publication Data

US 2022/0345159 A1 Oct. 27, 2022

(51) Int. Cl.
*H04B 1/00* (2006.01)
*H04W 28/02* (2009.01)
*H04W 52/34* (2009.01)

(52) U.S. Cl.
CPC ...... *H04B 1/0064* (2013.01); *H04W 28/0268* (2013.01); *H04W 52/34* (2013.01)

(58) Field of Classification Search
CPC . H04B 1/0064; H04W 28/0268; H04W 52/34
See application file for complete search history.

(56) References Cited

U.S. PATENT DOCUMENTS

| | | | |
|---|---|---|---|
| 4,594,654 A * | 6/1986 | Maniar | G06F 13/362 710/110 |
| 8,509,838 B2 | 8/2013 | Lee et al. | |
| 8,611,837 B2 | 12/2013 | Thorson et al. | |
| 8,880,128 B1 | 11/2014 | Gopalakrishnan et al. | |
| 8,995,939 B2 | 3/2015 | Thorson et al. | |
| 9,357,414 B2 * | 5/2016 | Kim | H04W 24/10 |
| 9,838,910 B2 * | 12/2017 | Rittenhouse | H04W 28/085 |
| 10,523,250 B2 | 12/2019 | Kong et al. | |
| 11,408,967 B2 * | 8/2022 | Douglas | G01S 5/0205 |
| 2005/0159153 A1 * | 7/2005 | Mousseau | H04W 36/0066 455/450 |
| 2006/0276132 A1 * | 12/2006 | Sheng-Fuh | H04B 1/48 455/41.2 |
| 2008/0082498 A1 * | 4/2008 | Dong | H04L 1/02 |
| 2008/0227485 A1 * | 9/2008 | Kim | H04B 1/406 455/552.1 |

(Continued)

FOREIGN PATENT DOCUMENTS

EP 2375571 B1 11/2016

OTHER PUBLICATIONS

NXP; "IW416: 2.4/5 GHz Dual-Band 1x1 Wi-Fi 4 (802.11n) + Bluetooth 5.1 Solution—Product Overview"; retreived from the Internet https://www.nxp.com/products/wireless/wi-fi-plus-bluetooth/iw416-2-4-5-ghz-dual-band-1x1-wi-fi-4-802-11n-plus-bluetooth-5-1-solution:88W8978; 3 pages (Apr. 15, 2021).

(Continued)

*Primary Examiner* — Dominic E Rego (57) ABSTRACT

One example discloses a multi-radio device, including: a controller configured to be coupled to a first radio that is configured to transmit a first signal, and a second radio that is configured to transmit a second signal; wherein the controller includes a detection element configured to detect a third signal generated in response to simultaneous transmission of the first and second signals; wherein the controller includes a decision element configured to modulate one or more information packets in the first and second signals in response to the third signal.

20 Claims, 5 Drawing Sheets

(56) References Cited

U.S. PATENT DOCUMENTS

| | | | | |
|---|---|---|---|---|
| 2010/0188248 A1* | 7/2010 | Sultan | ............... | G07C 9/00309 340/12.54 |
| 2011/0065400 A1* | 3/2011 | Teikari | ............... | H01Q 1/2291 455/129 |
| 2012/0182122 A1* | 7/2012 | Nishiguchi | ........... | B60R 25/245 455/69 |
| 2013/0051263 A1* | 2/2013 | Watanabe | ........... | H04W 72/085 370/252 |
| 2013/0142227 A1* | 6/2013 | Ferris | ................... | G06F 13/423 375/219 |
| 2013/0315116 A1* | 11/2013 | Chen | ................... | H04B 1/0475 455/78 |
| 2014/0170990 A1* | 6/2014 | Black | ................... | H04B 1/401 455/73 |
| 2015/0264743 A1* | 9/2015 | Yan | ..................... | H04B 7/0814 455/553.1 |
| 2016/0053524 A1* | 2/2016 | Serban | ................ | E05F 15/611 701/49 |
| 2016/0134383 A1* | 5/2016 | Banasky, Jr. | ........... | H04B 1/40 455/67.14 |
| 2016/0294578 A1* | 10/2016 | Maise | ............... | H04L 12/40013 |
| 2016/0335886 A1* | 11/2016 | Wei | ........................ | H04W 4/80 |
| 2016/0365995 A1* | 12/2016 | Liu | ....................... | H04B 7/0871 |
| 2017/0171813 A1* | 6/2017 | Khlat | ................... | H04W 24/08 |
| 2018/0026363 A1* | 1/2018 | Bevelacqua | ............. | H01Q 9/42 343/700 MS |
| 2018/0079461 A1* | 3/2018 | Stillman | ................. | B62J 45/20 |
| 2018/0118163 A1* | 5/2018 | Murakami | ............. | B60R 25/01 |
| 2019/0074849 A1* | 3/2019 | Zhu | ..................... | H03M 13/091 |
| 2021/0192233 A1* | 6/2021 | Critchley | ................ | G01S 7/003 |

OTHER PUBLICATIONS

NXP; "IW620: 2.4/5 GHz Dual-Band 2x2 Wi-Fi 6 (802.11ax) + Bluetooth 5.1 Solution"; retreived from the Internet https://www.nxp.com/products/wireless/wi-fi-plus-bluetooth/iw620-2-4-5-ghz-dual-band-2x2-wi-fi-6-802-11ax-plus-bluetooth-5-1-solution:IW620; 4 pages (Apr. 15, 2021).

NXP; IW416 Dual-band 1x1 Wi-Fi 4 and Bluetooth 5.1 Combo SoC Rev. 3—Preliminary data sheet; Mar. 12, 2021; 97 pages.

\* cited by examiner

MULTI-RADIO DEVICE

The present specification relates to systems, methods, apparatuses, devices, articles of manufacture and instructions for a multi-radio device.

SUMMARY

According to an example embodiment, a multi-radio device, comprising: a controller configured to be coupled to a first radio that is configured to transmit a first signal, and a second radio that is configured to transmit a second signal; wherein the controller includes a detection element configured to detect a third signal generated in response to simultaneous transmission of the first and second signals; and wherein the controller includes a decision element configured to modulate one or more information packets in the first and second signals in response to the third signal.

In another example embodiment, the multi-radio device and the first and second radios are embedded in a single multi-radio chip.

In another example embodiment, the first radio is configured to be couple to a first antenna; the second radio is configured to be couple to a second antenna; and the first antenna and the second antenna are separate antennas.

In another example embodiment, the radios include at least one of: Wi-Fi radio, a Bluetooth radio, or a personal area network radio.

In another example embodiment, the third signal is an emissions signal that violates a predetermined emissions limit.

In another example embodiment, the third signal is an intermodulation distortion (IMD) signal.

In another example embodiment, the third signal is generated in response to mixing a spectral power of the first signal with a spectral power of the second signal.

In another example embodiment, the first signal includes a first set of communications packets; the second signal includes a second set of communications packets; and the decision element is configured to reduce a transmit power level of at least one packet in the first and second sets of packets such that the third signal is less than a predetermined emissions limit.

In another example embodiment, the at least one packet is a lower priority packet.

In another example embodiment, the at least one packet is not transmitted if the reduced power level would not meet a level of service constraint.

In another example embodiment, if at least one packet is associated with an opportunistic transmission grant, then at least one packet is still transmitted even if the reduced power level would not meet a level of service constraint.

In another example embodiment, the first signal includes a first set of communications packets; the second signal includes a second set of communications packets; and the decision element is configured to abort a current transmission of at least one packet in the first and second sets of packets such that the third signal is less than a predetermined emissions limit.

In another example embodiment, the first signal includes a first set of communications packets; the second signal includes a second set of communications packets; and the decision element is configured to block a planned transmission of at least one packet in the first and second sets of packets such that the third signal is less than a predetermined emissions limit.

In another example embodiment, the detection element is configured to monitor the third signal actually generated in response to the simultaneous transmissions.

In another example embodiment, the detection element is configured to detect the simultaneous transmissions from at least one of: an RF frequency, an IF frequency, analog baseband signals, or digital baseband signals.

In another example embodiment, the detection element is configured to receive a set of transmission requests from the set of radios predicted to result in the simultaneous transmissions.

In another example embodiment, the detection element is configured to predict the third signal based on at least one of: a radio bandwidth, a radio modulation, an antenna isolation, or a requested transmit power level.

In another example embodiment, the third signal is within a restricted frequency band.

In another example embodiment, the restricted frequency band is an FCC (Federal Communications Commission) limited emissions band.

According to an example embodiment, a method of distributing instructions, stored on a non-transitory, tangible computer readable storage medium, for configuring a multi-radio device: wherein the multi-radio device includes, a first radio that is configured to transmit a first signal, a second radio that is configured to transmit a second signal, and a controller configured to be coupled to the first and second radios; wherein the instructions include, detecting a third signal generated in response to simultaneous transmission of the first and second signals; and modulating one or more information packets in the first and second signals in response to the third signal.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Regulation from a regulatory administration like FCC specifies unwanted emission in restricted bands from an intentional radiator. Such unwanted emission may come from a desired signal's skirt or intermodulation effects between a set of desired signals. The restricted bands in FCC regulation include 2200-2390 MHz and 2453.5-2500 MHz which are adjacent to the 2.4 GHz ISM band covering 2400-2483.5 MHz.

Unlicensed radios like Wi-Fi (WLAN) radios and narrowband radios (e.g. Bluetooth (BT) including basic rate, enhanced data rate, and Bluetooth low energy), and personal area networks (PAN) such as IEEE802.15.4) operate in the 2.4 GHz ISM band and can be included in a single multi-radio chip. These radios can have their own antenna or share antenna(s), can have separate receive low noise amplifier (LNA) or share LNA, and have their own transmit power amplifier (PA).

Radios in multi-radio chips have their own data paths and RF radios where simultaneous transmissions can occur on separate antennas. Each radio can schedule its own traffic; however, due to the asynchronous traffic among coexisting radios, more than one radio might transmit at a same time.

When more than one of these radios transmit their desired signal at a same time, any resulting intermodulation distortion (IMD) could generate unwanted signals/emissions in the restricted bands. Depending on variables such as, antenna isolation, signal characteristics, and transmit power levels of the simultaneous transmission, the unwanted emission due to IMD can exceed FCC regulations.

Earlier FCC regulations on unwanted emissions/signals in restricted bands only applied to simultaneous transmission on a same antenna. Simultaneous transmissions on separate antennas, were not regulated. However, in 2017, the regulations were revised and the condition of transmitting on a same antenna was removed. Now, as long as radios emit at a same time, regardless of whether on same or separate antennas, unwanted emissions in the restricted bands are regulated.

Although some radios (e.g. Wi-Fi and 802.15.4) have a mechanism to support channel change when the condition of the currently used channel becomes worse, they operate in a fixed channel for a long period of time. In addition, some radios supported by such multi-radio chips (e.g. Wi-Fi and 802.15.4) are not traffic schedule based and all the radios and nearby devices compete for a limited frequency spectrum in which to operate. Due to the asynchronous traffic between each of these radios, transmissions from these radios start and end at different times (i.e. are not aligned).

When two radios have simultaneous transmission, the IMD between each radio's transmit PAs results in increased unwanted emission. Frequency hopping radios in particular result in unwanted emission frequently falling into the restricted bands. The emission level from IMD depends on the antenna isolation, transmit power levels, signal bandwidths, modulation schemes, and PA characteristics of the two radios. Since most radio applications require the geographic area signal coverage to be as large as possible, high transmit powers are desired. Together with all other factors, the unwanted emission from IMD in simultaneous transmission results in FCC restricted band violations.

Figure 1:
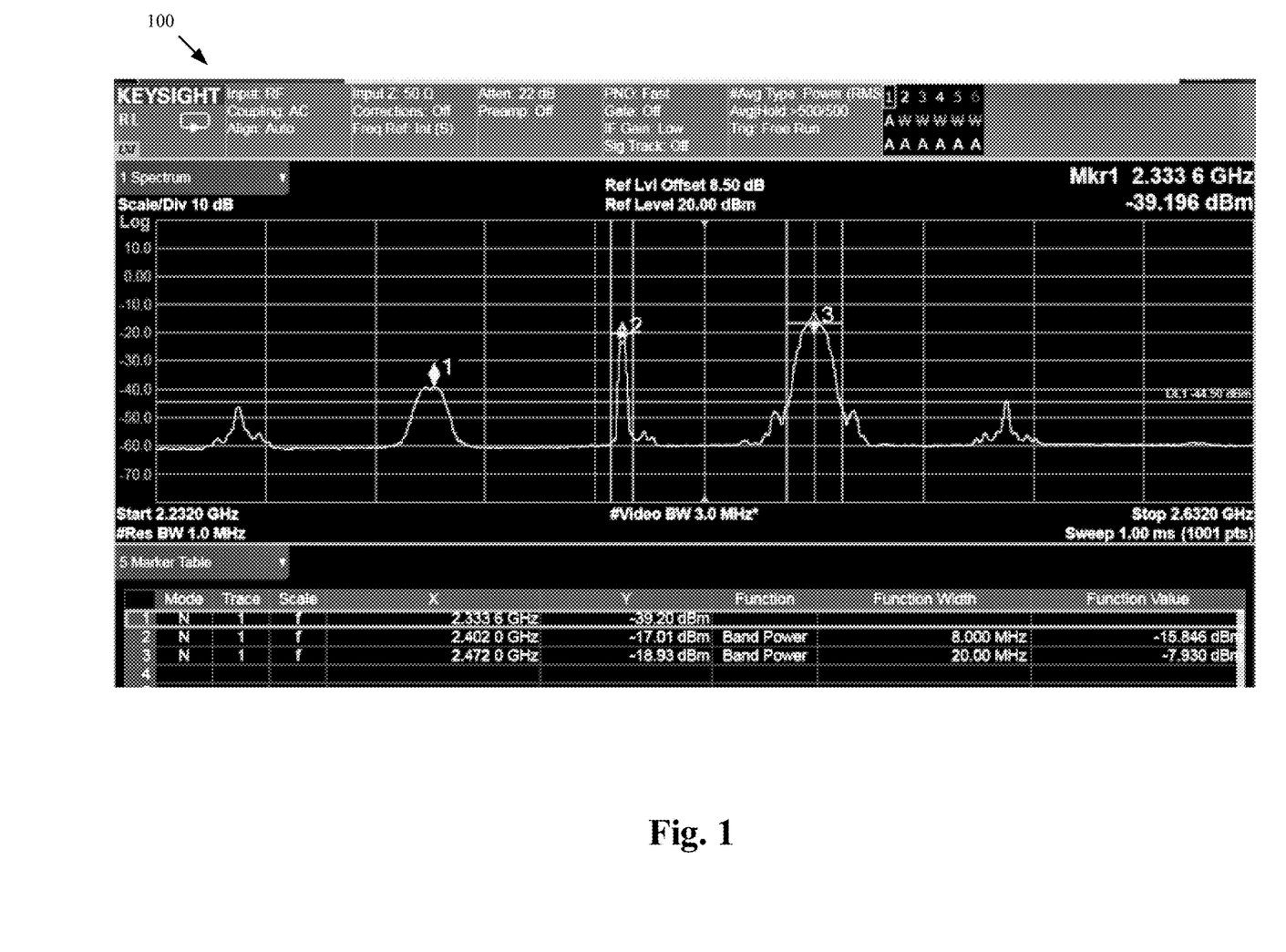
FIG. 1 is an example frequency spectrum recording of an emissions (e.g. FCC regulation) violation due to unwanted emissions resulting from two radios simultaneously transmitting.

FIG. 1 is an example 100 frequency spectrum recording of an emissions (e.g. FCC regulation) violation due to unwanted emissions resulting from two radios simultaneously transmitting. In this example the first radio is a Wi-Fi radio and the second radio a BT radio.

Marker-2 (i.e. marker has a diamond shape) identifies a BT signal transmitted by the BT radio. Marker-3 identifies a Wi-Fi signal transmitted by the WiFi radio. Marker-1 identifies a resulting IMD signal due to overlapping/simultaneous signal transmissions (i.e. marker-2 and marker-3) from both the BT radio and the WiFi radio transmitting at their default transmit (Tx) power levels. This IMD signal (i.e. marker-1) exceeds an FCC's requirement that the IMD signal be −41.5 dBm/MHz or lower.

Now discussed are various example embodiments of a multi-radio device for dynamic (i.e. packet-by-packet) power adjustment and operation control in multiple radio simultaneous transmission to mitigate unwanted emissions.

Figure 2:
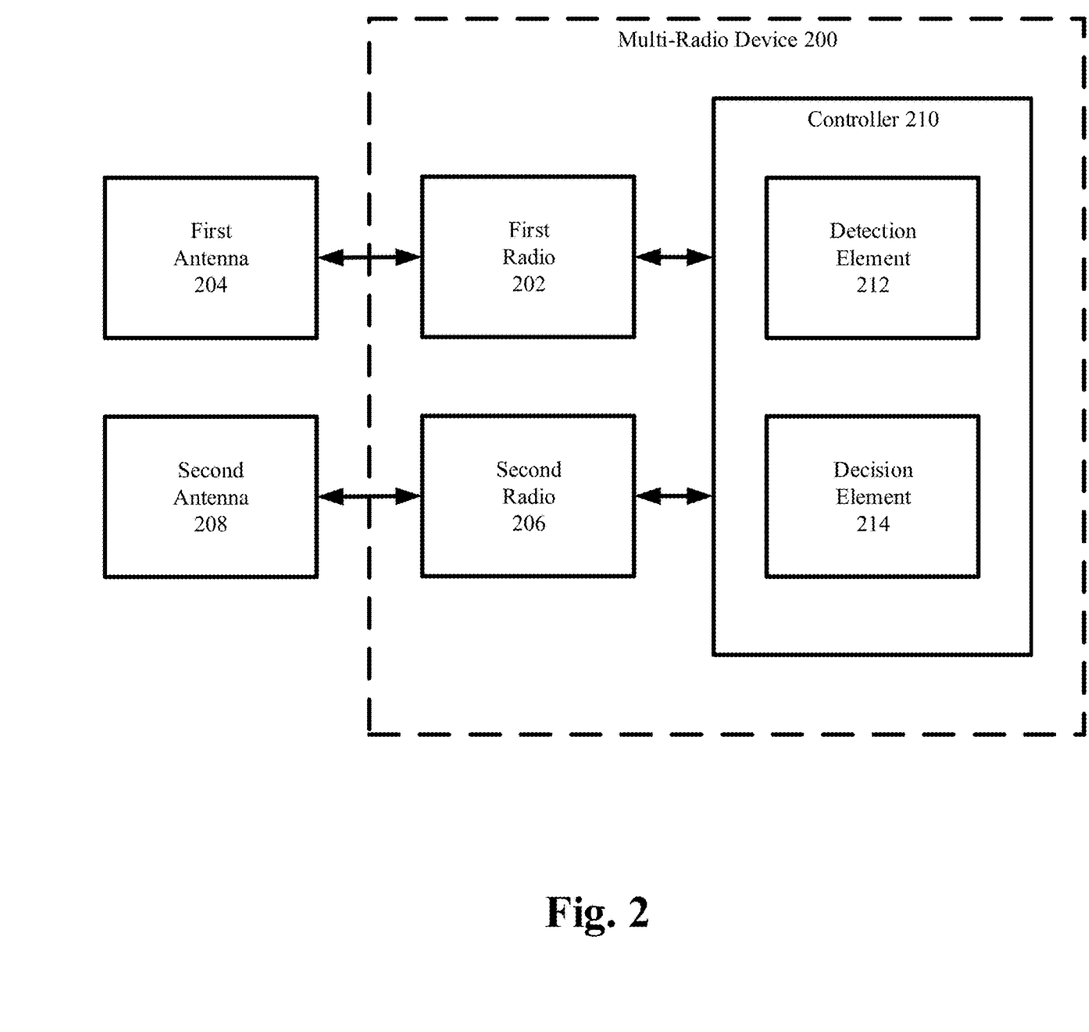
FIG. 2 is a first example of a multi-radio device.

FIG. 2 is a first example multi-radio device 200. The first example multi-radio device 200 includes a first radio 202 configured to be coupled to a first antenna 204, a second radio 206 configured to be coupled to a second antenna 208, and a controller 210. The controller 210 includes a detection element 212 and a decision element 214.

The controller 210 is configured to be coupled to the first radio 202 that is configured to transmit a first signal, and the second radio 206 that is configured to transmit a second signal. The detection element 212 is configured to detect a third signal generated in response to simultaneous transmission of the first and second signals. The decision element 214 is configured to modulate one or more information packets (e.g. communications, beacons, data, management, etc.) in the first and second signals in response to the third signal. Examples of modulate include adjusting a parameter/attribute of a packet (e.g. power level, priority level, etc.), aborting a current transmission of a packet, and not transmitting a packet.

For example, the detection element 212 detects an unwanted emission violation (e.g. intermodulation distortion (IMD)) due to spectral mixing of the simultaneous transmission of the first and second signals. Detection can be either: at the RF frequency level from the first and second antennas 204, 208, at the IF frequency level withing the first and second radios, 202, 206, and/or at analog baseband level received by or within the first and second radios, 202, 206. Such detection may also be predictive based on digital signal, as a further example.

The decision element 214 then takes an action to stop and/or prevent the unwanted emission violation. Such actions in some example embodiments include adjusting the transmit power of either or both the first and second signals to an allowable level, aborting one or more packet transmissions in either or both the first or second signals even if they are already ongoing, and/or blocking transmission for one or more packet transmissions in either or both the first or second signals that has/have not yet started. In example embodiments, the detection and decision are at the packet level since the IMD varies from packet to packet.

Figure 3:
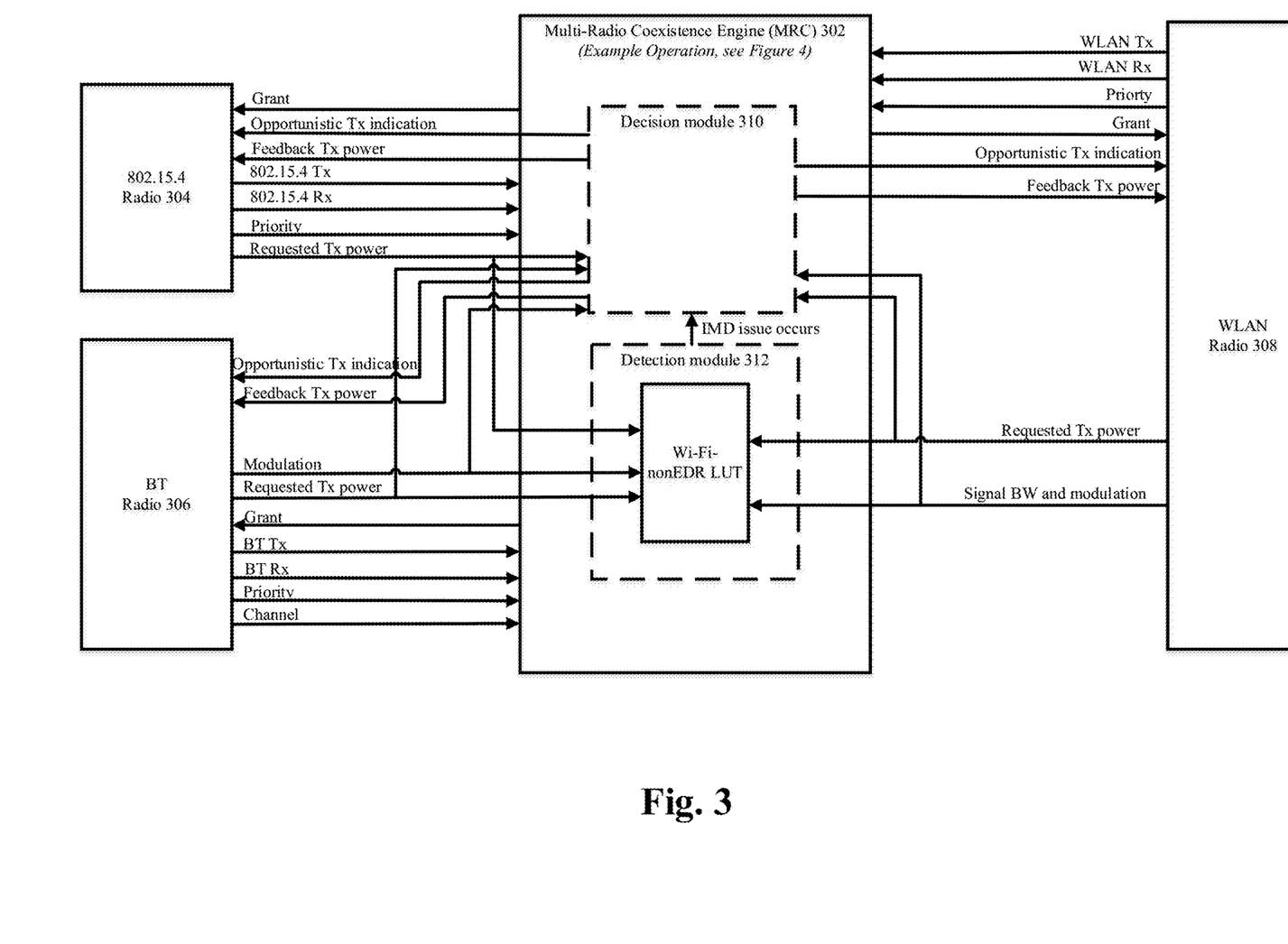
FIG. 3 is a second example of the multi-radio device.

FIG. 3 is a second example multi-radio device 300. The second example multi-radio device 300 includes a multi-radio coexistence engine (MRC) 302, a first radio 304 (e.g. PAN-IEEE 802.15.4 radio), a second radio 306 (e.g. BT radio), and a third radio 308 (WiFi radio). The MRC 302 includes a detection module 310 and a decision module 312. Various example interface signals exchanged between MRC 302 and each of the radios 304, 306, 308 are also shown in FIG. 3.

The detection module 310 within the MRC 302 determines if an IMD issue happens. The decision module 312 within the MRC 302 instructs each radio 304, 306, 308 with an action to be taken that would resolve the IMD issue. The actions may include adjusting a power of one radio transmission to an allowable level, abort a radio transmission if it is already ongoing, or no radio transmission for queued traffic that has not started to be transmitted.

In this example embodiment, the detection module 310 includes a programmable look-up table. The look-up table is indexed by: Wi-Fi mode, Wi-Fi Tx requested power, BT/802.15.4 modulation, BT/802.15.4 requested Tx power, and BT channels. The look-up table output in this example embodiment is a one-bit result indicating whether an IMD issue exists.

The Wi-Fi mode indicates the Wi-Fi's signal bandwidth including OFDMA resource units and modulation. The Wi-Fi mode, the Wi-Fi Tx power, the BT/802.15.4 Tx power, the BT/802.15.4 modulation, and BT channel information is harvested from the interface signals between each IP block and MRC 302 (e.g. as shown in FIG. 3).

In some example embodiments, each radio 304, 306, 308 can further associate a priority level for its data packet(s), Tx power level and so on which is then used by the decision module 312 to either reduce another radio's Tx power level, abort another radio's packet transmissions, and/or block another radio's packet transmissions.

These priority levels can be moderated further using an opportunistic transmission grant (e.g. flag). An opportunistic Tx grant means a radio having a lower priority transmission compared to another radio's transmission, can nevertheless be transmitted at the reduced power level even if such lower priority transmission might not be able to be received by another wireless device. For example even though the another wireless device is very far away from the multi-radio device 300, the another radio's transmission is still transmitted opportunistically, which is considered better than not transmitting the radio's transmission at all.

When an opportunistic Tx grant is enabled, if two radios request to transmit at the same time, a higher priority request is granted to operate at a requested Tx power level, and a lower priority request is granted opportunistically at an adjusted/lower Tx power level.

If one transmission is already on-going, and a second radio's request to transmit comes in later, if the on-going transmission has lower priority than the later coming request, then the on-going traffic is aborted, and the higher priority request is granted at the requested Tx power.

If the on-going transmission has a higher priority than a later coming request, the later coming lower priority request is granted opportunistically at an adjusted Tx power.

In some example embodiments, an opportunistic grant to or by one or more radios 304, 306, 308 is indicated by a grant signal assertion together with an asserted Tx power adjusted indication. The allowed adjusted Tx power level is also fed back from the MRC 302 to each radio 304, 306, 308.

The adjusted Tx power level for an opportunistic Tx grant can be stored in a second set of look-up tables. For example, a NB opportunistic Tx table can be used when BT or 802.15.4 has the opportunistic Tx grant; and a Wi-Fi opportunistic Tx table can be used when Wi-Fi has the opportunistic Tx grant. The input to each of these look-up tables is an index composed of the Tx power of the coexisting radio whose Tx power remain as requested, BT/BLE modulation, the Wi-Fi mode, and the BT channel. The output is the allowed Tx power for an opportunistic Tx grant.

Example look-up tables include: a NB opportunistic Tx table having an Input index (Wi-Fi mode, Wi-Fi Tx power, BT/BLE modulation, and BT channel), and an Output (allowed power for an BT/15.4 opportunistic Tx); and a Wi-Fi opportunistic Tx table having an Input index (Wi-Fi mode, BT/802.15.4 Tx power and modulation, and BT channel), and an Output (allowed power for a Wi-Fi opportunistic Tx).

Since the Tx power of Wi-Fi and BT can vary in every packet, the IMD issue is evaluated at the packet-by-packet level and a power adjustment, abort, stop, and/or an opportunistic Tx decision is made every time overlapping radio transmissions are detected (e.g. such as when Wi-Fi and NB systems request to transmit simultaneously).

The look-up tables in the detection module 310 and the decision module 312 in some example embodiments are programmable based on prior characterization measurements of a multi-radio chip hosting the multi-radio device 300 and connected to a specific set of antennas having specific antenna isolation characteristics.

Figure 4:
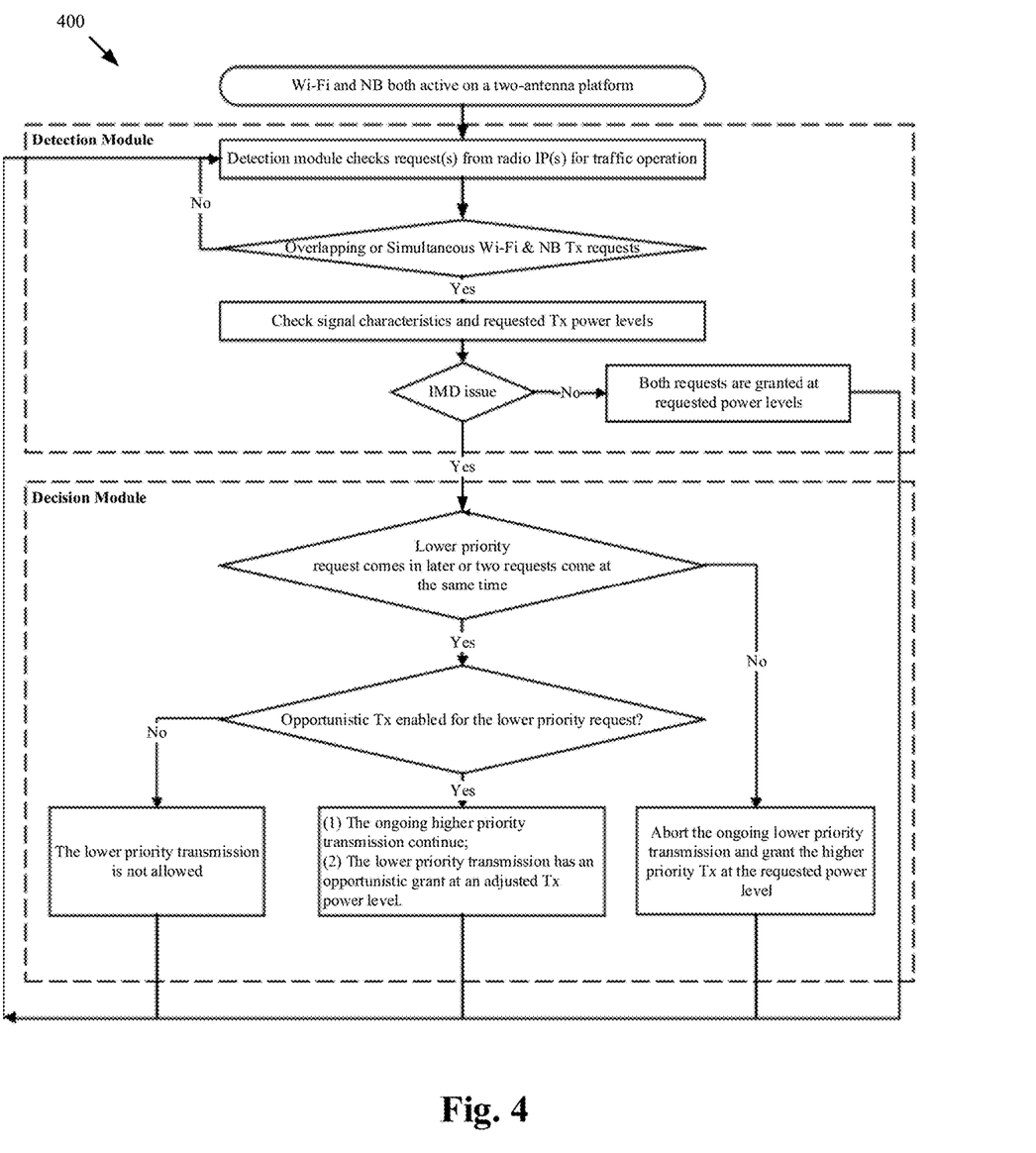
FIG. 4 is an example set of instructions for enabling the multi-radio device.

FIG. 4 is an example set of instructions 400 for enabling the multi-radio device 200. Shown are example instructions for implementing both the detection element 212 and the decision element 214 in either software and/or hardware. In some example embodiments, these instructions are hosted by the controller 210.

The order in which the instructions are discussed does not limit the order in which other example embodiments implement the instructions unless otherwise specifically stated. Additionally, in some embodiments the instructions are implemented concurrently.

Figure 5:
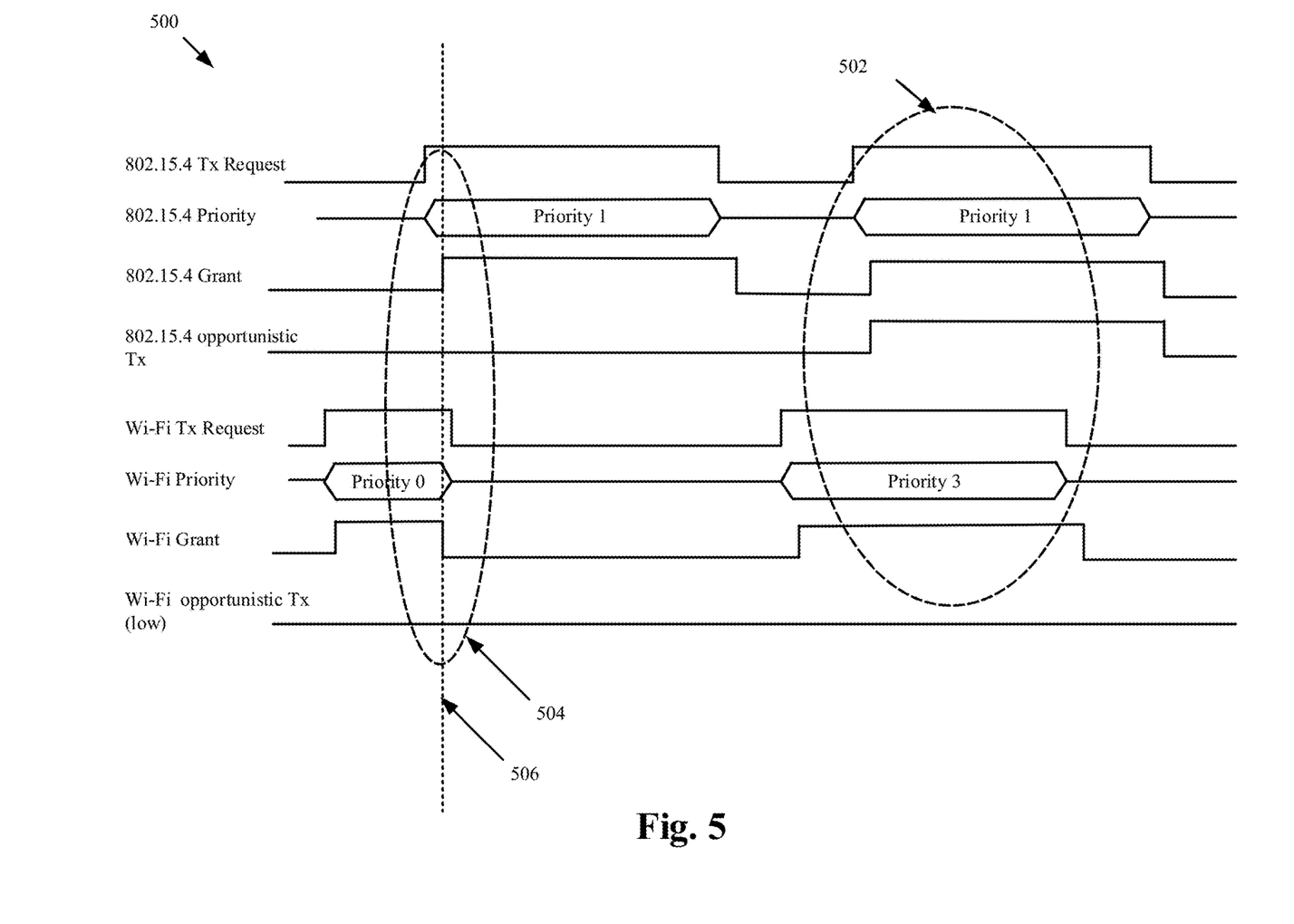
FIG. 5 is an example timing diagram of the multi-radio device mediating between two radios.

FIG. 5 is an example timing diagram 500 of the multi-radio device mediating between two radios (i.e. an 802.15.4 radio and a Wi-Fi radio). In this example priority-3 is a highest priority level and priority-0 is a lowest priority level.

In a first overlap region 502 where simultaneous transmission by both radios may result in IMD, the higher priority (i.e. priority-3) signal from the Wi-Fi radio has received a "Wi-Fi Grant" permission to transmit. Then when the 802.15.4 radio has a lower priority (i.e. priority-1) signal to transmit the 802.15.4 radio still receives the "802.15.4 Grant" signal because the 802.15.4 radio has its opportunistic Tx flag enabled; however the 802.15.4 radio can only transmit at a adjusted/lower power level due to its lower priority compared to the ongoing Wi-Fi transmission.

In a second overlap region 504 where simultaneous transmission by both radios may result in IMD, the lower priority (i.e. priority-0) signal from the Wi-Fi radio has received a "Wi-Fi Grant" permission to transmit. However, this lower priority Wi-Fi signal is immediately aborted at time 506 due to a later coming higher priority (i.e. priority-1) 802.15.4 radio signal that then receives the "802.15.4 Grant" signal. The Wi-Fi signal transmission was aborted. Changing the Tx power in the middle of a transmission would result in reception error.

Regarding the instructions 400 discussed above, various combinations of hardware, software and cloud services can host these instructions. Such systems can include an input/output data interface, a processor, a storage device, and a non-transitory machine-readable storage medium. The machine-readable storage medium includes the instructions which control how the processor receives input data and transforms the input data into output data, using data within the storage device. The machine-readable storage medium in an alternate example embodiment is a non-transitory computer-readable storage medium. In other example embodiments the set of instructions described above can be implemented either using logic gates, application specific chips, firmware, as well as other hardware forms.

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions described above are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A multi-radio device, comprising:
a controller configured to be coupled to a first radio that is configured to transmit a first signal, and a second radio that is configured to transmit a second signal;
wherein the controller includes a detection element configured to detect a third signal generated in response to simultaneous transmission of the first and second signals; and
wherein the controller includes a decision element configured to modulate one or more information packets in the first and second signals in response to the third signal.

2. The device of claim 1:
wherein the multi-radio device and the first and second radios are embedded in a single multi-radio chip.

3. The device of claim 1:
wherein the first radio is configured to be couple to a first antenna;
wherein the second radio is configured to be couple to a second antenna; and
wherein the first antenna and the second antenna are separate antennas.

4. The device of claim 1:
wherein the radios include at least one of: Wi-Fi radio, a Bluetooth radio, or a personal area network radio.

5. The device of claim 1:
wherein the third signal is an emissions signal that violates a predetermined emissions limit.

6. The device of claim 1:
wherein the third signal is an intermodulation distortion (IMD) signal.

7. The device of claim 1:
wherein the third signal is generated in response to mixing a spectral power of the first signal with a spectral power of the second signal.

8. The device of claim 1:
wherein the first signal includes a first set of communications packets;
wherein the second signal includes a second set of communications packets; and
wherein the decision element is configured to reduce a transmit power level of at least one packet in the first and second sets of packets such that the third signal is less than a predetermined emissions limit.

9. The device of claim 8:
wherein the at least one packet is a lower priority packet.

10. The device of claim 8:
wherein the at least one packet is not transmitted if the reduced power level would not meet a level of service constraint.

11. The device of claim 8:
wherein if at least one packet is associated with an opportunistic transmission grant, then at least one packet is still transmitted even if the reduced power level would not meet a level of service constraint.

12. The device of claim 1:
wherein the first signal includes a first set of communications packets;
wherein the second signal includes a second set of communications packets; and
wherein the decision element is configured to abort a current transmission of at least one packet in the first and second sets of packets such that the third signal is less than a predetermined emissions limit.

13. The device of claim 1:
wherein the first signal includes a first set of communications packets;
wherein the second signal includes a second set of communications packets; and
wherein the decision element is configured to block a planned transmission of at least one packet in the first and second sets of packets such that the third signal is less than a predetermined emissions limit.

14. The device of claim 1:
wherein the detection element is configured to monitor the third signal actually generated in response to the simultaneous transmissions.

15. The device of claim 14:
wherein the detection element is configured to detect the simultaneous transmissions from at least one of: an RF frequency, an IF frequency, analog baseband signals, or digital baseband signals.

16. The device of claim 1:
wherein the detection element is configured to receive a set of transmission requests from the set of radios predicted to result in the simultaneous transmissions.

17. The device of claim 16:
wherein the detection element is configured to predict the third signal based on at least one of: a radio bandwidth, a radio modulation, an antenna isolation, or a requested transmit power level.

18. The device of claim 1:
   wherein the third signal is within a restricted frequency band.

19. The device of claim 18:
   wherein the restricted frequency band is an FCC (Federal Communications Commission) limited emissions band.

20. A method of distributing instructions, stored on a non-transitory, tangible computer readable storage medium, for configuring a multi-radio device:
   wherein the multi-radio device includes,
      a first radio that is configured to transmit a first signal,
      a second radio that is configured to transmit a second signal, and
      a controller configured to be coupled to the first and second radios;
   wherein the instructions include,
      detecting a third signal generated in response to simultaneous transmission of the first and second signals; and
      modulating one or more information packets in the first and second signals in response to the third signal.

\* \* \* \* \*